United States Patent [19]

Miller

[11] Patent Number: 5,637,875
[45] Date of Patent: Jun. 10, 1997

[54] METHOD OF ENHANCING RADIATION RESPONSE OF RADIATION DETECTION MATERIALS

[75] Inventor: Steven D. Miller, Richland, Wash.

[73] Assignee: Battelle Memorial Institute, Richland, Wash.

[21] Appl. No.: 499,260

[22] Filed: Jul. 7, 1995

[51] Int. Cl.$^6$ ................................. G01T 1/10; G01T 1/02
[52] U.S. Cl. ........................... 250/474.1; 250/484.5
[58] Field of Search ........................ 250/474.1, 484.3, 250/484.5

[56] References Cited

U.S. PATENT DOCUMENTS

| | | | |
|---|---|---|---|
| Re. 28,340 | 2/1975 | Stewart et al. | 250/484.3 |
| 2,763,786 | 9/1956 | Mauer et al. | 250/474.1 |
| 2,934,651 | 4/1960 | Etzel et al. | 250/484.5 |
| 3,141,973 | 7/1964 | Heins et al. | 250/484.3 |
| 3,402,293 | 9/1968 | Shambon | 250/484.3 |
| 3,896,306 | 7/1975 | Becker et al. | 250/484.3 |
| 4,001,587 | 1/1977 | Panchenkov et al. | 250/474.1 |
| 4,510,174 | 4/1985 | Holzapfel et al. | 250/484.3 |
| 4,922,105 | 5/1990 | Hosoi | 250/484.4 |
| 5,091,653 | 2/1992 | Creager et al. | 250/484.5 |

*Primary Examiner*—Carolyn E. Fields
*Attorney, Agent, or Firm*—Paul W. Zimmerman

[57] ABSTRACT

The present invention is a method of increasing radiation response of a radiation detection material for a given radiation signal by first pressurizing the radiation detection material. Pressurization may be accomplished by any means including mechanical and/or hydraulic. In this application, the term "pressure" includes fluid pressure and/or mechanical stress.

20 Claims, 4 Drawing Sheets

METHOD OF ENHANCING RADIATION RESPONSE OF RADIATION DETECTION MATERIALS

FIELD OF THE INVENTION

The present invention relates generally to a method for enhancing radiation response of radiation detection materials. More specifically, the present invention relates to exposing a radiation detection material to an elevated pressure for obtaining greater radiation response compared to unpressurized or unpressed radiation detection material.

BACKGROUND OF THE INVENTION

Radiation detection materials are used for indicators, for example radiation dosimeters, and exhibit a response generally proportional to a radiation stimulus. In previous work, specifically U.S. Pat. No. 5,272,348, a luminescent response was enhanced through the use of an optical stimulating signal. In U.S. Pat. No. 4,954,707, a thermoluminescent response was enhanced by cooling the thermoluminescent material to temperatures below dry ice temperatures.

In spite of these sensitivity enhancements, there still remains a need for yet further sensitivity enhancements because of ever increasing demands for greater accuracy of measurements.

SUMMARY OF THE INVENTION

The present invention is a method of increasing radiation response of a radiation detection material for a given radiation signal by first pressurizing the radiation detection material. Pressurization may be accomplished by any means, including mechanical and/or hydraulic. In this application, the term "pressure" includes fluid pressure and/or mechanical stress.

It is therefore an object of the present invention to provide a method of increasing radiation response of a radiation detection material by pressurization or pressing.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
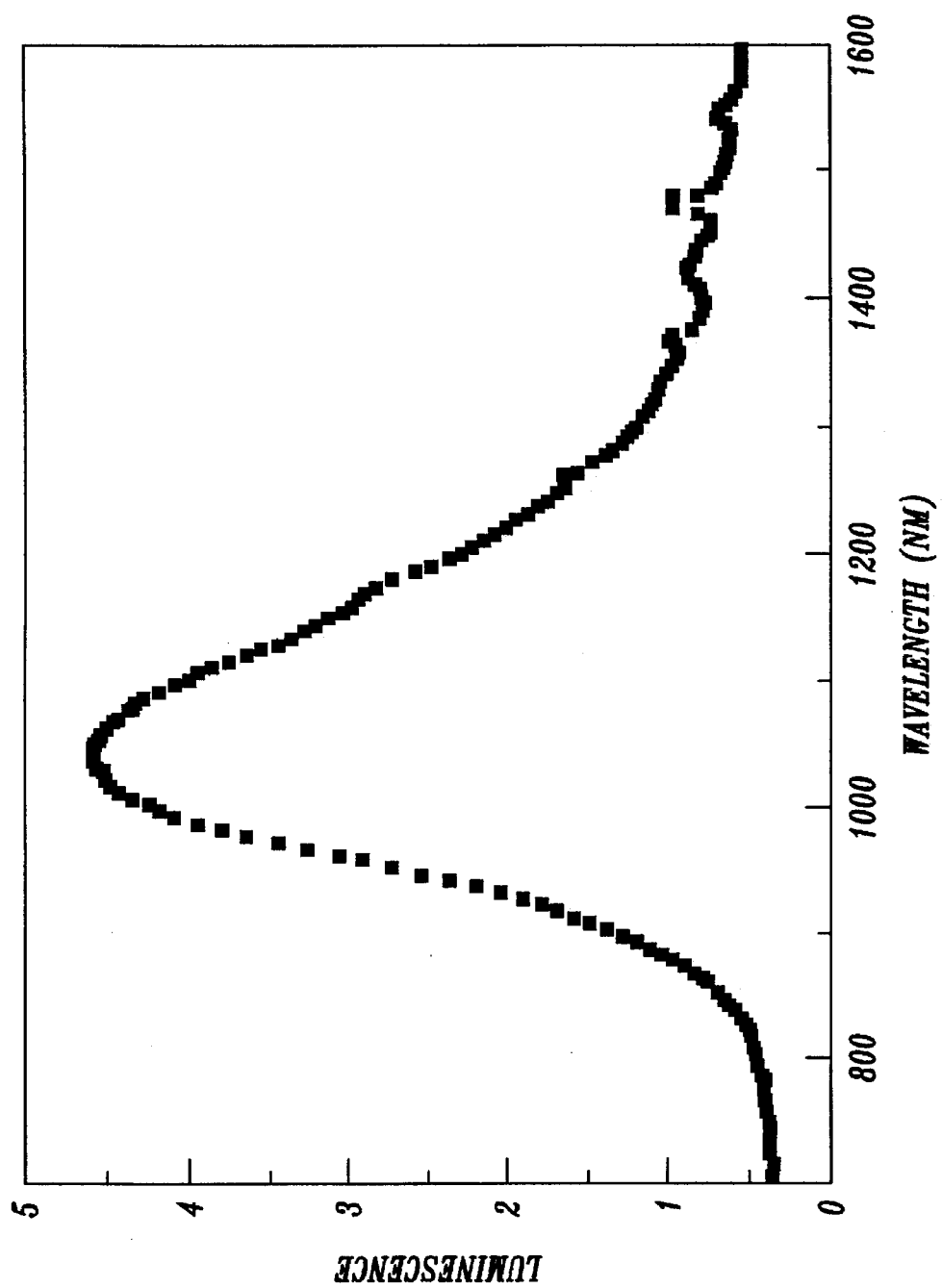
FIG. 1 is an emission spectra for LiF pressed to 40,000 psi.

The present invention is the pressurization of a radiation detection material to obtain greater radiation response for a given radiation stimulus.

Radiation detection materials that experience increased radiation response as a result of pressurization include but are not limited to alkali halides, for example LiF, NaCl, KCl, NaBr, and CsI; alkali-earths, for example Be, Mg, Ca, Sr, Ba and halides thereof, for example $CaF_2$, $MgF_2$, $CaCl_2$, $MgCl_2$, $SrF_2$, $BaF_2$; ceramics, for example $Al_2O_3$, $SiO_2$, and $TiO_2$; alkali metals, for example borates; and sulfates, for example $Li_2B_4O_7$, $Mg_2B_4O_7$, $CaSO_4$ and $MgSO_4$. Preferred radiation detection materials are those that are stable crystalline materials through a range of temperatures and pressures.

Pressures range from about 25 psi to any achievable pressure. A practical upper limit of pressure is a pressure above which heating of the radiation detection material occurs to a sufficient extent to anneal the radiation detection material. Annealing means placing a radiation detection material in a state equivalent to an unpressed state. A practical lower limit of pressure is a pressure below which subsequent enhanced luminescence is not observed. The pressure must be sufficient to affect luminescent centers in the material. It is expected that pressures in excess of 1000 psi are sufficient to enhance radiation response by a factor of from about 100 to about 10,000.

Radiation response includes color change of the radiation detection material, luminescence from luminescent centers within the radiation detection material, or a combination of color change and luminescence.

The present invention is particularly useful for measuring or detecting a radiation dose. A radiation detection material is first pressed, then exposed to a dose of radiation. The radiation response of the radiation detection material is enhanced by the pressing, making the radiation response more easily observed.

Once pressed, the radiation detection material may be ground into powder and still maintain the pressure enhancement. However, heating to between about 200° C. to about 300° C. completely anneals or destroys the pressure enhancement at least for LiF.

EXAMPLE 1

An experiment was conducted to demonstrate enhanced radiation response by pressing radiation detection material. A sample of salt (NaCl) was pressed to a pressure of 40,000 psi. A second sample of NaCl was not pressed.

Both samples were exposed to radiation from 1,000 to 100,000 Rads. The pressed sample became almost black upon radiation exposure to 100,000 Rads, while the unpressed sample remained substantially uncolored. The pressed sample permitted observation of a color change of the NaCl that was visible to the eye at a radiation exposure of 1,000 Rads.

The irradiated NaCl was found to absorb yellow-red light and to re-emit or luminesce in the infrared thereby demonstrating its usefulness as an optically stimulated luminescence (OSL) material.

The color of the irradiated NaCl faded after exposure to room light (fluorescent light) for a few hours.

EXAMPLE 2

Because NaCl faded in room light, LiF, which has smaller lattice constants, was tried. Samples of LiF were pressed to pressures from 40,000 psi to 90,000 psi.

Upon exposure to $10^5$ Rads, LiF samples of small grain size colored very dramatically to a dark purple-blue. It was surprising that the irradiated LiF absorbed yellow-red light very efficiently and re-emitted in the infrared. Although LiF is known to re-emit in the infrared, it is not known to absorb efficiently yellow-red light. Moreover, the re-emission of the pressed samples was many orders of magnitude greater than previously known re-emission from unpressed LiF.

Unpressed LiF crystals showed no coloration upon exposure to $10^5$ Rads.

Three crystals of LiF having dimensions of 6 mm×6 mm×2 mm were pressed together. Crystals of this size are very large, possibly "infinite" from a practical standpoint. Using the "infinite" grain size resulted in darker coloration for a given level of radiation compared to the small grain size crystals. Thus, it was demonstrated that larger grain sizes enhance coloration of pressed alkali halide luminescent materials.

EXAMPLE 3

A sample of LiF particles having a size range from about 75 microns to about 180 microns was pressed into a pellet at 40,000 psi. The pellet was finely ground then mixed at 10% by weight with a commercially available injection-moldable plastic. Landauer, Inc., manufactured the dosimeters used in this study using the process of injection-molding. Dosemeter dimensions were 3.74×1.82×0.05 cm. Radiation exposure was $10^5$ Rad. Readout was accomplished using a 2-mW He-Ne laser and a red-extended photomultiplier tube (Burle 8852) used in photon-counting mode. Optical filters were used to block the scattered red laser light and to pass the infrared OSL luminescence.

Figure 2:
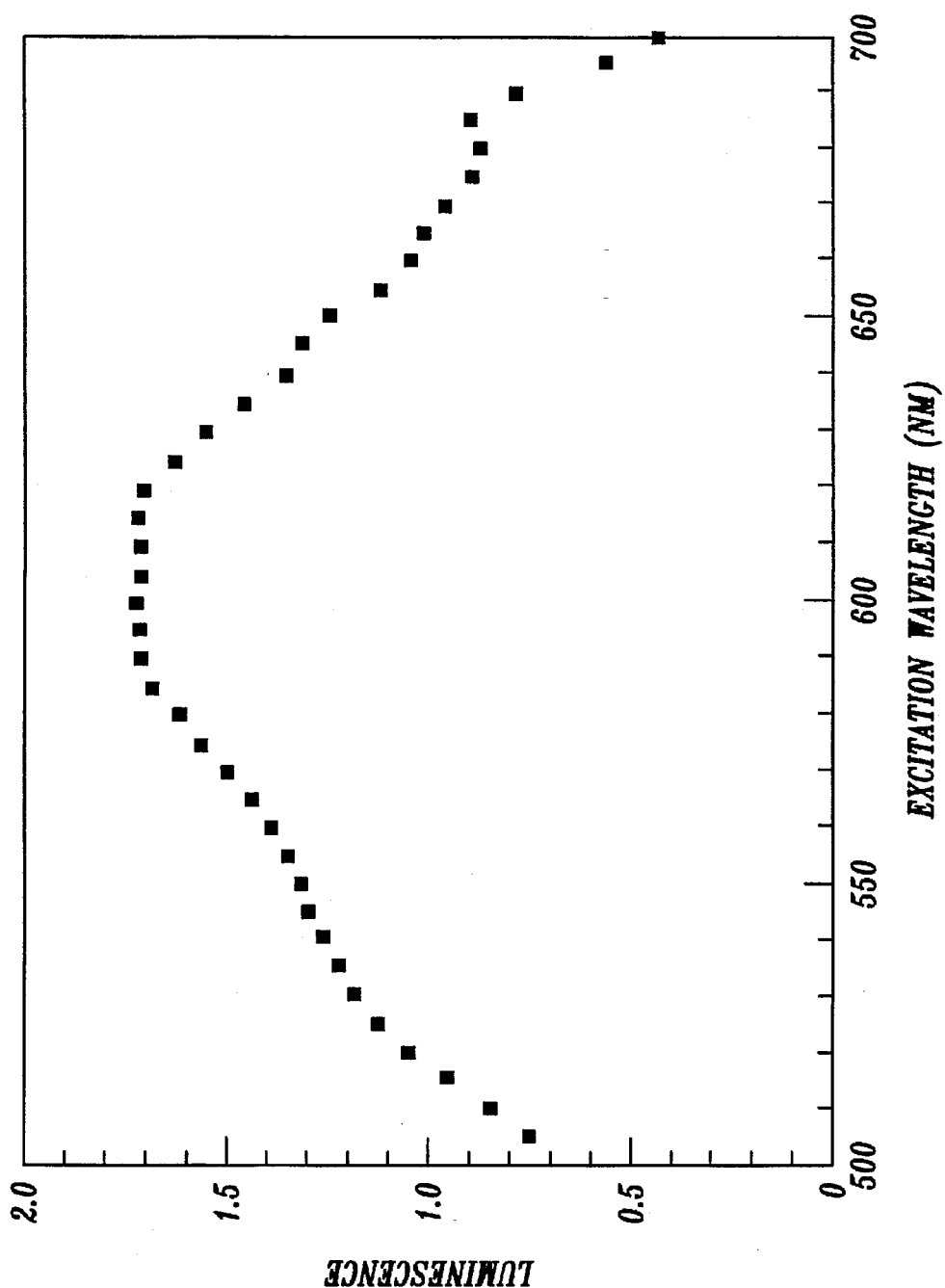
FIG. 2 is an infrared excitation spectra for LiF pressed to 40,000 psi.
Figure 3:
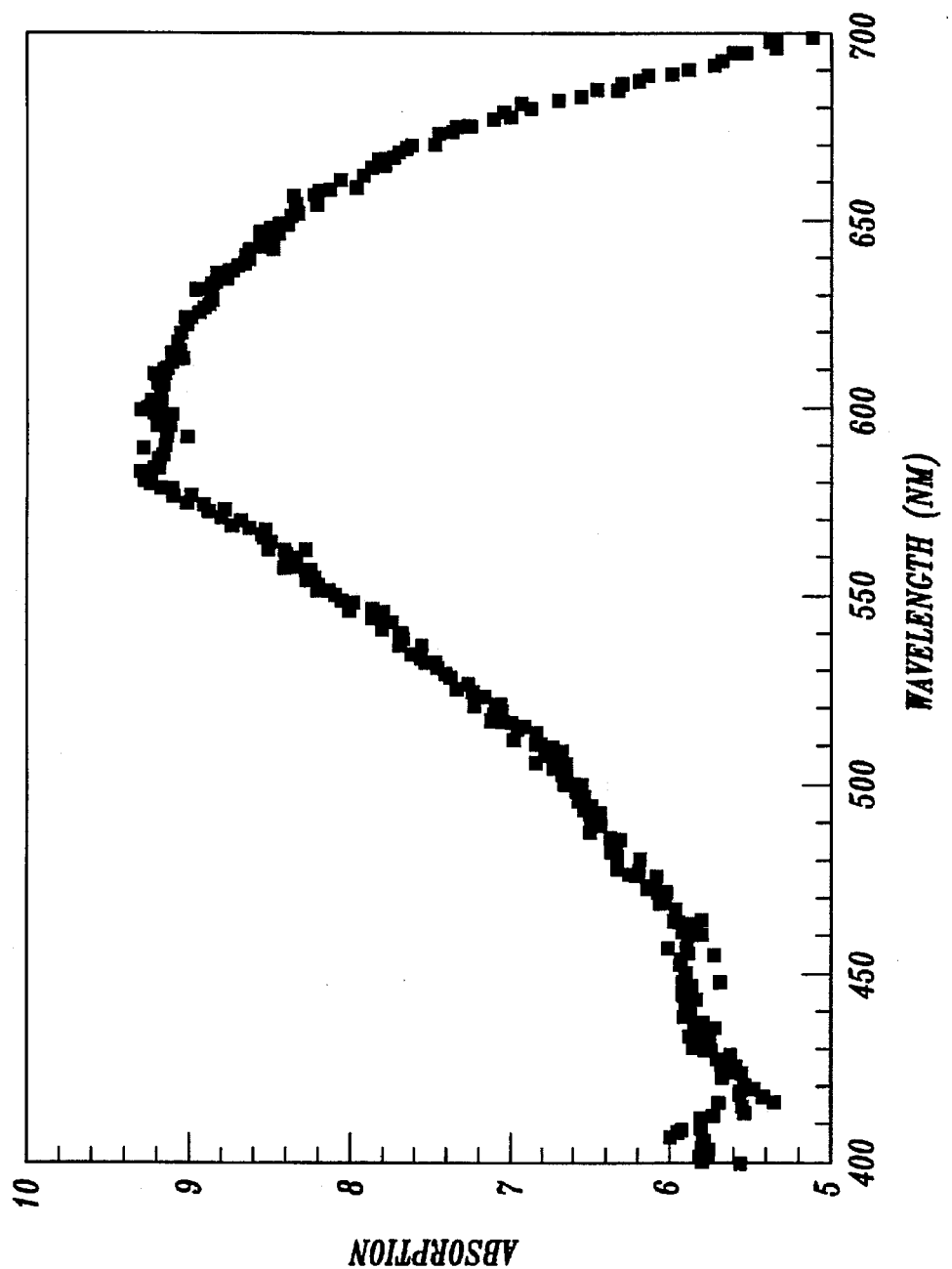
FIG. 3 is an optical absorption spectra for LiF pressed to 40,000 psi.

A commercially available fluorometer was used to collect the excitation and emission spectra from the LiF samples. The emission spectra were collected first and revealed a single broad emission band centered at 1050 nm using 600-nm excitation light (FIG. 1). The excitation spectra displayed a single peak maximized at around 600 nm when the fluorometer was set to collect the 1050-nm OSL emission peak (FIG. 2). A low-cost battery-powered diode laser may be used to excite the LiF near the peak of the excitation band. An optical absorbance spectrum (FIG. 3) shows a surprisingly high absorbance. Absorbance of LiF is generally less than about 0.35 which is orders of magnitude less than the minimum 5.0 shown in FIG. 3.

Figure 4:
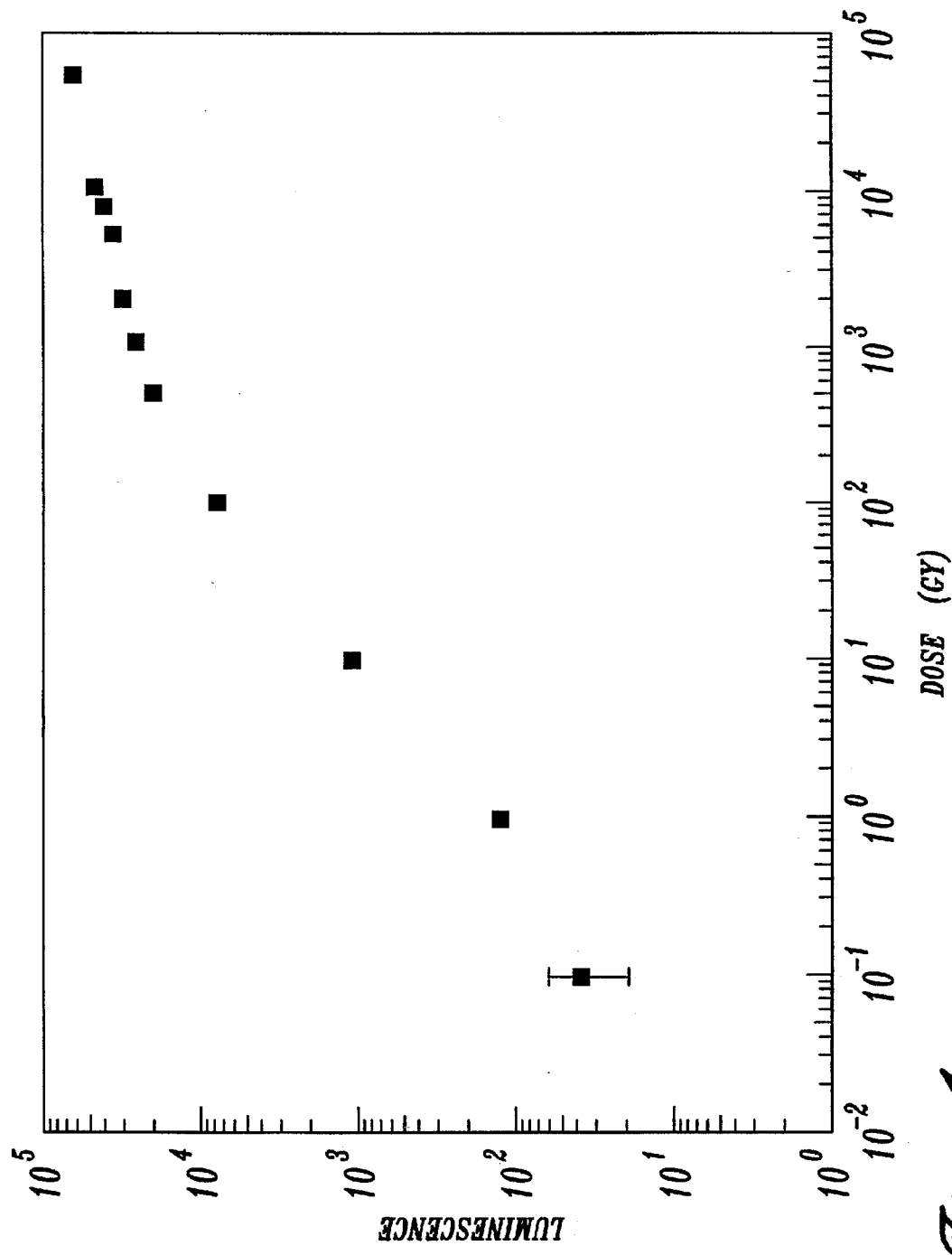
FIG. 4 is a graph of response (radiation response) versus radiation dose or exposure for LiF pressed to 40,000 psi.

Twelve exposures were made from 1 Gy up to $5\times10^4$ Gy and the infrared OSL measured using the reader described above. The response versus exposure (FIG. 4) displayed a very nonlinear behavior at higher doses. The encouraging part of this study was the unexpected fact that many of the dosimeters tested displayed a standard deviation in readings of around 2%. The dosimeters were the result of a first mass manufacturing test and no selection of the dosimeters for uniformity was done. This high degree of precision was welcomed at this early stage of development. A high-speed optical inspection method may be tested in the future to eliminate any dosimeters that do not meet very stringent quality control specifications. A 1% standard deviation in raw counts of detectors significantly above the minimum detectable dose appears to be achievable with minimal selection loss.

EXAMPLE 4

One of the disadvantages of film dosimetry and many OSL/TL systems such as $Al_2O_3$:C is their sensitivity to light. Any accidental exposure of these systems to ambient light can have serious effects on the reported radiation doses. The light sensitivity of the LiF/polymer dosimeters was ascertained by exposing the dosimeters to 4 hours of office lighting and also to 16 hours of a 1 sun-equivalent light source. The 4-hour office light exposure had no effect on a previously exposed dosemeter (i.e., the reading was identical before and after light exposure). A 4-hour office light exposure is nearly sufficient to completely anneal $Al_2O_3$:C using OSL, COSL, or TL readout methods. A solar simulator purchased from Oriel provided the 1 sun-equivalent light spectrum. No lasting effect was observed for $Al_2O_3$:C as a result of this 16-hour light exposure, testifying that this OSL system is surprisingly robust.

EXAMPLE 5

A sample of pressed LiF was heated to about 300° C. then exposed to radiation. Subsequent measurement of radiation response showed that the effect of pressing was completely destroyed by heating.

It is believed that heating to a temperature above about 200° C. is sufficient to destroy the pressing enhancement for most radiation detection materials.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of increasing optical response to light stimulation of a crystalline ionizing radiation detection material that exhibits an increase in optical response with an increase in a radiation dose, said method comprising the steps of:

(a) selecting a pressure above 25 psi; and (b) sensitizing the crystalline ionizing radiation detection material by applying the selected pressure to the crystalline ionizing radiation detection material and maintaining a temperature of the crystalline ionizing radiation detection material below a sensitization loss temperature.

2. The method as recited in claim 1, wherein the temperature is maintained below about 200° C.

3. The method as recited in claim 1, wherein the pressure is greater than about 1,000 psi.

4. The method as recited in claim 3, wherein the pressure is greater than about 10,000 psi.

5. The method as recited in claim 4, wherein the pressure is greater than about 40,000 psi.

6. The method as recited in claim 1, wherein the ionizing radiation detection material is selected from the group consisting of alkali halides, alkali earths, alkaline metals, ceramics, and any combination thereof.

7. The method as recited in claim 1, wherein said crystalline ionizing radiation detection material is selected from the group consisting of alkali halides, alkali-earths, metal oxide ceramics, alkali metals, and sulfates.

8. The method as recited in claim 7, wherein said alkali halide is lithium fluoride.

9. A method of measuring radiation dose with a crystalline ionizing radiation detection material that exhibits an increase i optical response with an increase in said radiation dose, said method comprising the steps of:

(a) sensitizing the crystalline ionizing radiation detection material, the material being of a type that experiences an increased radiation response as a result of pressurization and a loss of the increased radiation response by exposure to a temperature in excess of a sensitization loss temperature, said sensitizing accomplished by pressing the crystalline ionizing radiation detection material and maintaining a temperature of the crystalline ionizing radiation detection material below the sensitization loss temperature;

(b) exposing the pressed ionizing crystalline radiation detection material to ionizing radiation; and (c) measuring the optical response from the exposed pressed crystalline ionizing radiation detection material.

10. The method as recited in claim 9, wherein measuring comprises observing a change in color of the exposed pressed ionizing radiation detection material.

11. The method as recited in claim 9, wherein measuring comprises observing the optical response as a luminescence of the exposed pressed ionizing radiation detection material.

12. The method as recited in claim 9, further comprising the step of:

grinding the pressed material prior to exposing.

13. The method as recited in claim 9, wherein said temperature is below about 200° C.

14. The method as recited in claim 9, wherein said crystalline ionizing radiation detection material is selected from the group consisting of alkali halides, alkali-earths, metal oxide ceramics, alkali metals, and sulfates.

15. The method as recited in claim 14, wherein said alkali halide is lithium fluoride.

16. A method of measuring radiation dose, comprising the steps of:

(a) selecting a crystalline radiation detection material;

(b) sensitizing said crystalline radiation detection material by pressing it to a pressure greater than about 25 psi and maintaining a temperature of the crystalline radiation detection material below a sensitization loss temperature;

(c) exposing said sensitized crystalline radiation detection material to ionizing radiation;

(d) stimulating the exposed material with light; and (e) measuring an infrared re-emission from the stimulated material.

17. The method as recited in claim 16, wherein said crystalline radiation detection material is lithium fluoride.

18. The method as recited in claim 16, wherein said temperature is below about 200° C.

19. A method of increasing an optical response of a crystalline ionizing radiation detection material that exhibits an increase in optical response with an increase in a radiation dose, said method comprising the steps of:

(a) selecting a pressure above 25 psi; and (b) sensitizing the crystalline ionizing radiation detection material by applying the selected pressure to the crystalline ionizing radiation detection material and maintaining a temperature of the crystalline ionizing radiation detection material below a sensitization loss temperature.

20. The method as recited in claim 19, wherein said optical response is a luminescence response.

* * * * *

UNITED STATES PATENT AND TRADEMARK OFFICE
CERTIFICATE OF CORRECTION

PATENT NO.   : 5,637,875
DATED        : Jun. 10, 1997
INVENTOR(S)  : Steven D. Miller It is certified that error appears in the above-indentified patent and that said Letters Patent is hereby corrected as shown below:

In column 4, line 60, please replace the "i" with --in--.

Signed and Sealed this

Fourth Day of November, 1997

Attest:

BRUCE LEHMAN

Attesting Officer

Commissioner of Patents and Trademarks